United States Patent
Gaiser et al.

(10) Patent No.: US 6,748,706 B2
(45) Date of Patent: Jun. 15, 2004

(54) CONNECTION BETWEEN THE LOWER EDGE OF A MOTOR VEHICLE WINDSHIELD AND A WATER DEFLECTOR

(75) Inventors: Werner Gaiser, Stockach (DE); Matthias Sprotte, Rapperswil (CH); Casper Koster, Rapperswil (CH)

(73) Assignee: Weidmann Plastics Technology AG, Rapperswil (CH)

( * ) Notice: Subject to any disclaimer, the term of this patent is extended or adjusted under 35 U.S.C. 154(b) by 0 days.

(21) Appl. No.: 10/182,241

(22) PCT Filed: Sep. 26, 2001

(86) PCT No.: PCT/CH01/00580
§ 371 (c)(1),
(2), (4) Date: Jul. 25, 2002

(87) PCT Pub. No.: WO02/43979
PCT Pub. Date: Jun. 6, 2002

(65) Prior Publication Data
US 2003/0000162 A1 Jan. 2, 2003

(30) Foreign Application Priority Data
Nov. 30, 2000 (CH) .............................................. 2327/00

(51) Int. Cl.⁷ .................................................. B60J 10/02
(52) U.S. Cl. ................. 52/208; 52/204.597; 52/204.53; 52/717.01; 286/146.15; 286/201
(58) Field of Search ........................... 52/204.5, 204.53, 52/208, 717.03, 717.01, 716.8, 204.597; 296/201, 206, 84.1, 96.2, 146.15

(56) References Cited

U.S. PATENT DOCUMENTS

| | | | | |
|---|---|---|---|---|
| 2,549,315 A | * | 4/1951 | Kramer | 296/96.21 |
| 3,571,994 A | * | 3/1971 | Brown et al. | 52/209 |
| 4,571,278 A | * | 2/1986 | Kunert | 156/108 |
| 4,650,240 A | * | 3/1987 | Rinella | 296/93 |
| 4,858,988 A | | 8/1989 | Morgan et al. | |
| 4,950,019 A | * | 8/1990 | Gross | 296/93 |
| 5,352,010 A | | 10/1994 | Brodie et al. | |
| 5,460,424 A | * | 10/1995 | Wagner | 296/146.14 |
| 5,538,314 A | * | 7/1996 | Young et al. | 296/146.15 |
| 5,561,954 A | * | 10/1996 | Watanabe et al. | 52/204.597 |
| 5,603,546 A | * | 2/1997 | Desir, Sr. | 296/93 |
| 5,752,352 A | * | 5/1998 | Goto et al. | 52/208 |
| 5,906,697 A | * | 5/1999 | Hasegawa et al. | 156/108 |
| 6,134,851 A | * | 10/2000 | Roze et al. | 52/204.597 |
| 6,487,823 B2 | * | 12/2002 | Lagrue | 52/208 |

FOREIGN PATENT DOCUMENTS

| | | |
|---|---|---|
| DE | 087 10 531 U | 9/1987 |
| DE | 200 08 555 U | 8/2000 |
| FR | 2 668 110 A | 4/1992 |
| FR | 2 754 503 A | 4/1998 |

* cited by examiner

*Primary Examiner*—Brian E. Glessner
(74) *Attorney, Agent, or Firm*—Sughrue Mion, PLLC

(57) ABSTRACT

The connection comprises a window frame (5, 5'), which extends along the lower edge (1a) of the windshield (1), which is fastened to the bottom side (1b) of the windshield, and which forms a channel (5) extending essentially parallel to the lower edge (1a). A wedge (14, 24, 34, 44, 54) is inserted into the channel (5) of the window frame (5, 5') and fixes a retaining connecting member (2a) of the water deflector (2) inside the channel (5). The wedge (14, 24, 34, 44, 54) is preferably provided in the form of a strip. The connection enables the water deflector (2) to be mounted more easily and quickly.

19 Claims, 3 Drawing Sheets

CONNECTION BETWEEN THE LOWER EDGE OF A MOTOR VEHICLE WINDSHIELD AND A WATER DEFLECTOR

BACKGROUND OF THE INVENTION

The invention relates to a connection between the lower edge of a motor vehicle windshield and a water deflector, comprising a window frame, which extends along the lower edge of the windshield and which is fastened to the bottom side of the windshield, whereby said window frame forms a channel extending essentially parallel to the lower edge and whereby a retaining connecting member of the water deflector engages said channel.

Such connections have been used in the rule in automobiles for some time and are therefore generally known. The connection fixes the water deflector to the lower edge of the windshield and it acts as a waterproof transition piece from the windshield to the water deflector. Water running down the outside of the windshield flows into a water container via the water deflector. This connection is made by hand during assembly of the automobile. The retaining connecting member is thereby manually pushed into a channel of the window frame. This channel extends essentially along the entire length of the lower edge of the windshield. The channel is relatively narrow and is difficult to be found. In addition, the force needed to push the retaining connecting member into the channel is relatively large, which therefore makes assembly laborious. To this end, it must be taken into consideration that such connections must be made in series, one after the other. Another factor is the occurrence of very high [assembly] tolerances. The connection must be designed in such a manner that it does not have to depend on a tolerance to a large extent.

SUMMARY OF THE INVENTION

It is the object of the invention to create a connection of the aforementioned type whereby the water deflector may be mounted in a simpler manner. Yet, the connection should form a tight seal, it must not depend on a tolerance, and it should be economical in its production as well.

The object is achieved in that a wedge is inserted into the channel, which secures the retaining connection member inside the channel. The channel in the inventive connection may be designed considerably wider than the one in prior art. A force must be applied for the locking engagement during insertion of the retaining connecting member into the channel. The water collector may thereby be arranged on the window frame without the use of [considerable] force. The wedge is subsequently inserted and the retaining connecting member is thereby secured inside the channel. Insertion of the wedge is especially simple when it is designed in the form of a strip. The wedge may then be inserted into the channel at one end and it is then continuously pushed into the channel in a longitudinal direction. Expenditure of force for the insertion of the wedge is relatively small. This applies also when the wedge is locked in place. The wedge is preferably interlocked with the retaining connecting member. However, conceivable is also an interlocking of the wedge with the retaining connecting member together with the window frame.

An additional advantage of the inventive connection may be that the wedge is designed to be flush at the frontal side with the outer side of the windshield. Windshield wipers may thus be easily retracted to a resting position on the water deflector. Finally, disassembly is very simple since only the wedge has to be pulled from the channel. It has been shown that the inventive connection is highly waterproof and that it provides an excellent hold. Should the wedge be made of elastic material, e.g. aerated plastics, then especially large tolerances may be compensated.

According to one development of the invention, the wedge is made of harder synthetic material in the retention area than in the area lying above. On one hand, a better locking effect may thereby be achieved, and, on the other hand, higher tolerance compensation and better [vibration] damping may be achieved in the softer area.

Additional advantageous characteristics are shown in the dependent patent claims and in the following description and drawings.

DETAILED DESCRIPTION OF EXEMPLARY EMBODIMENTS

Figure 1:
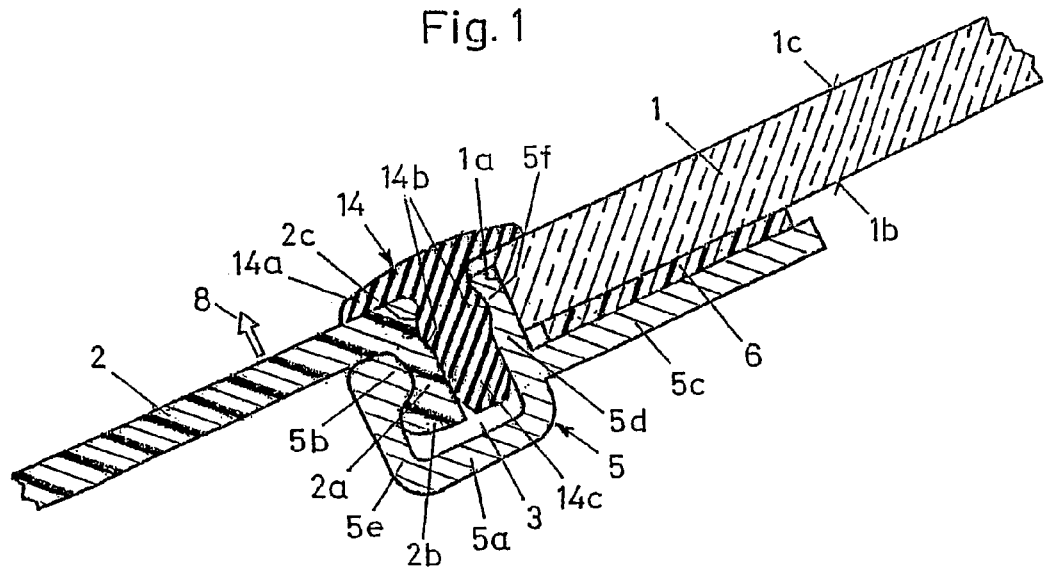
FIG. 1 shows a sectional view through a connection according to the invention.

The windshield 1 shown in FIG. 1 is a traditional windshield installed in a motor vehicle, particularly an automobile, having an outer side 1c, an inner side 1b, and a lower edge 1a. A window frame 5 is fastened on the inner side 1b to a strip-shaped member 5c by means of an adhesive strip 6 or a suitable adhesive material. A U-shaped piece 5a is molded onto the strip 5c whereby said U-shaped piece 5a forms a channel 3 that extends along the lower edge 1a. Said channel 3 is obviously open on top and is defined on the sides by parallel walls 5d and 5e. A retaining lip 5b projecting inwardly is molded to the wall 5e. Said retaining lip 5b obviously narrows the opening of the channel 3.

A water deflector 2, which may form the cover for a water container (of which only the upper edge is shown) is provided with a retaining connecting member 2a, which obviously reaches into the channel 3 along its entire length. Said retaining connecting member 2a is also provided with a retaining lip 2b molded thereto, which interlocks with the retaining lip 5b. The water deflector 2 is preferably made of a suitable synthetic material.

The wedge 14 is mushroom-shaped in its cross section and extends along the entire length of the channel 3. Said wedge 14 has an engagement element 14c onto which two opposed locking ribs 14b are arranged, whereby one of them locks into a locking groove 2c of the water deflector 2, and the other one locks into a locking groove 5f of the window frame 5. The wedge 14 is preferably made of an elastic material and is dimensioned in such a manner that it rests against the retaining connecting member 2a and the wall 5d while being under tension. An outer strip-shaped projection 14a rests also against the outer side of the water deflector 2 and the outer side 1c of the windshield 1 while being under tension. The wedge 14 holds the retaining connecting member 2a in the shown interlocked position and prevents thereby that the water deflector 2 is lifted from the channel 3 in the direction of arrow 8. The connection between the water deflector 2 and the window frame 5 is designed in such a manner that the water deflector 2 may not be disengaged in the direction of the arrow 8. Based on said tension and the tight fit of the wedge 14 to the retaining connecting member 2a and to the wall 5d, the connection is additionally waterproof so that the water running down on the outer side 1c cannot enter the channel 3.

During installation of the water deflector 2, the windshield 1 is already fastened to the chassis and the window frame 5 is attached to the lower edge of the windshield 1 by means of an adhesive strip 6. The wedge 14 is not yet inserted into the channel. At first, the water deflector 2 is fitted onto the window frame 5 whereby the retaining connecting member 2a rests against the wall 5a, as it can be seen in FIG. 1. The wedge 14 is now snapped into the channel 3 at one of its ends and it is subsequently continuously pushed into the channel 3 in longitudinal direction. The opposed ribs 14b lock thereby into the grooves 2c and 5f. The installation of the water deflector 2 is thus finished. The wedge 14 is grasped at its one end and is pulled from the channel 3 during disassembly (removal). Subsequently, re-installation is possible as explained above. The channel 3 is obviously relatively wide so that the water deflector 2 may be simply and rapidly placed on the window frame 5 without [considerable] force expenditure, even at poor accessibility and visibility.

Figure 2:
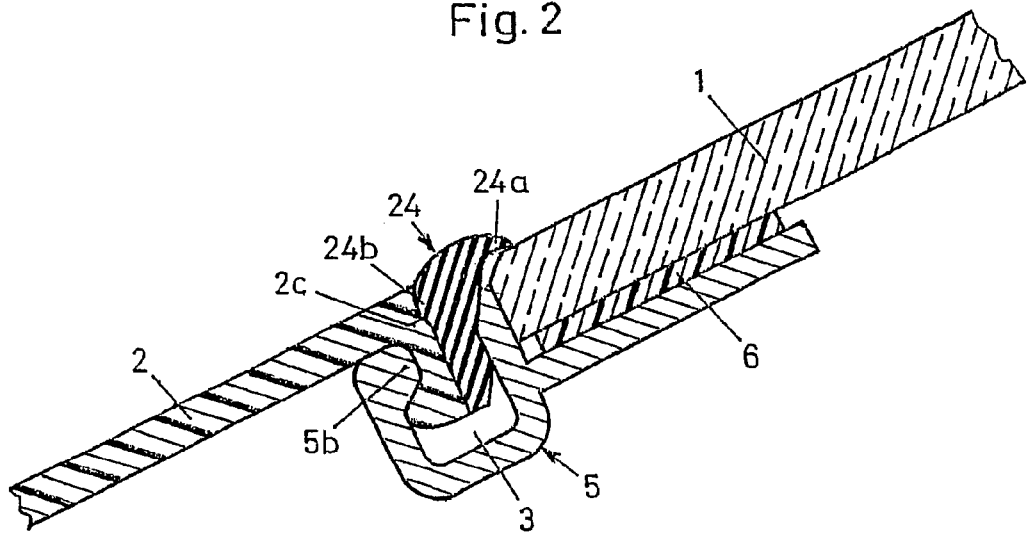
FIG. 2 shows a sectional view through one variation of the connection according to the invention.

The embodiment according to FIG. 2 is provided with a wedge 24, which has approximately the shape of a half-moon and which is provided with a locking rib 24b that locks into a locking groove 2c of the water deflector 2. An edge 24a rests elastically tensioned against the outer side 1c of the windshield. Installation is performed basically the same as for the connection in FIG. 1.

Figure 3:
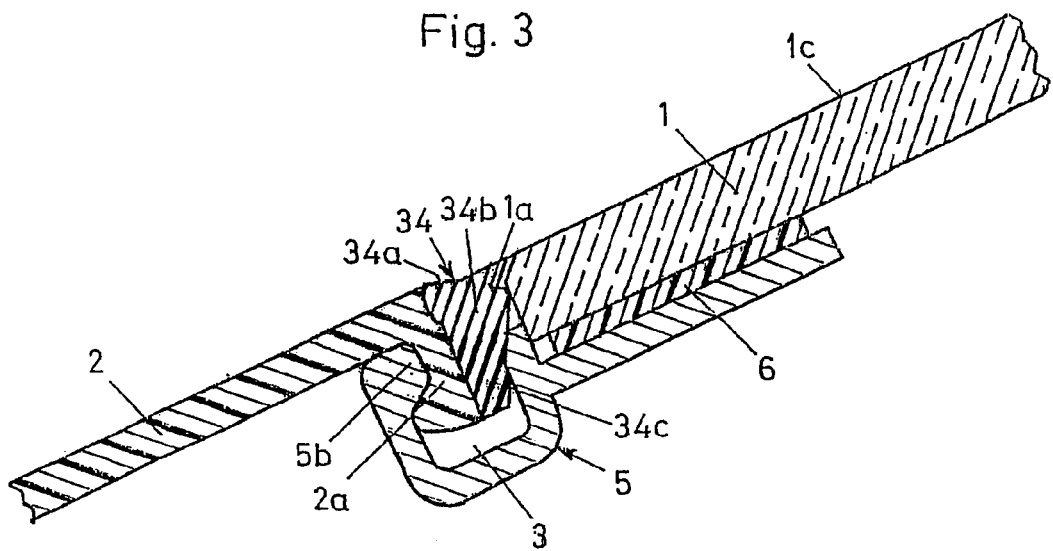
FIG. 3 shows a sectional view through an additional variation of the connection according to the invention.

The connection in FIG. 3 is provided with a wedge 34 of which the front side 34a is flush with the outer side 1c of the windshield 1. In addition, the wedge rests resilient and forms a seal against the lower edge 1a of the windshield 1. Said wedge 34 is provided with two sections 34b and 34c of varying hardness. The harder section 34c securely holds the retaining connecting member 2a in its shown locked position. Installation and disassembly is also performed in the same manner as explained above. The flush compactness of the wedge 34 has the considerable advantage that the windshield wiper may be retracted without any problem onto the water deflector 2 and into a resting position.

Figure 4:
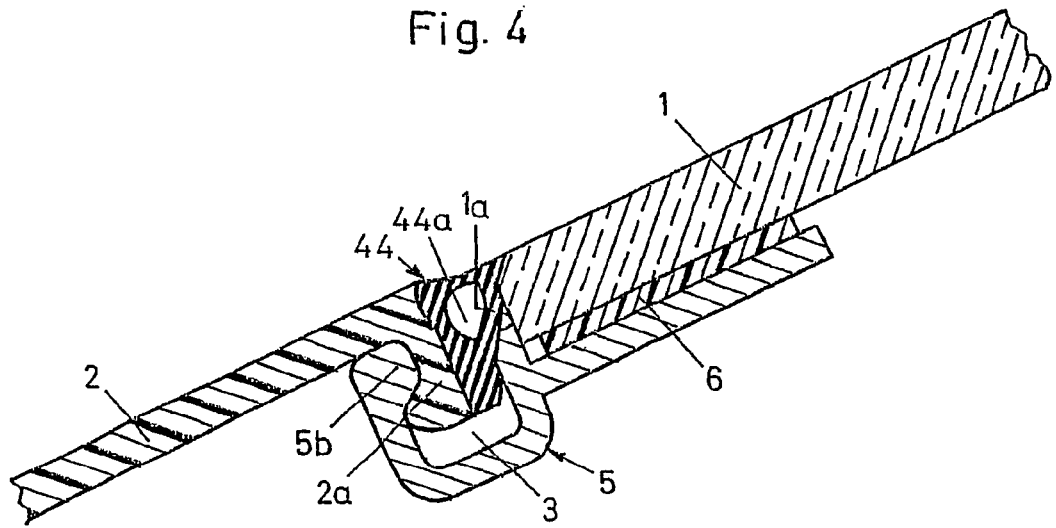
FIG. 4 shows a sectional view through another variation of the connection according to the invention.

The connection in FIG. 4 is also defined by said flush compactness. However, a wedge 44 is proposed thereby that is provided with an inner channel 44a, which preferably extends along the entire length of the wedge 44. Said inner channel 44 has the advantage that it increases the elasticity of the wedge 44 whereby it can take up especially large tolerance deviations. Such tolerance deviations are caused especially by the orientation and position of the lower edge 1a. The space between the lower edge 1a and the retaining connecting member 2a may vary thereby.

Figure 5:
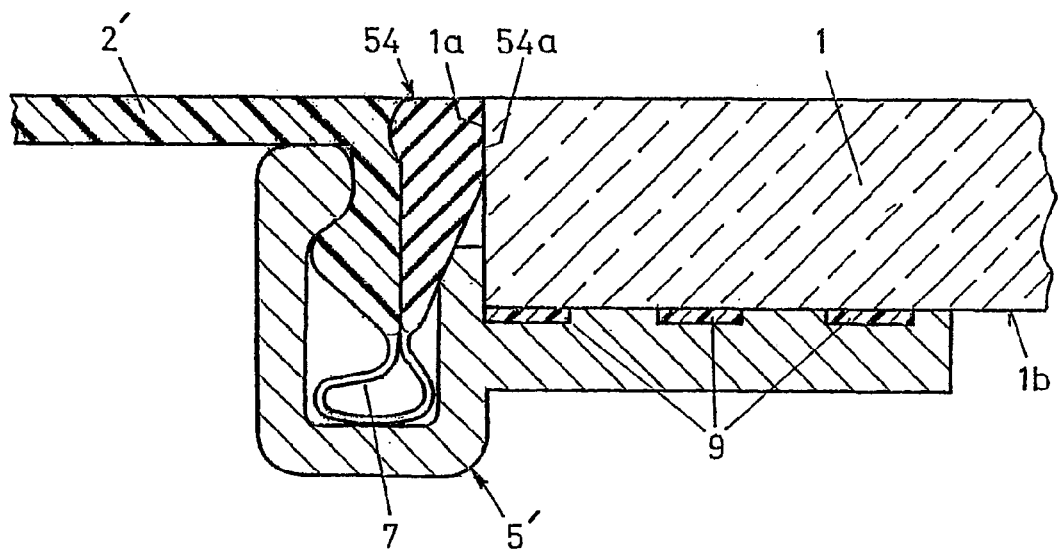
FIG. 5 shows a sectional view through yet another variation of the connection according to the invention.
Figure 6:
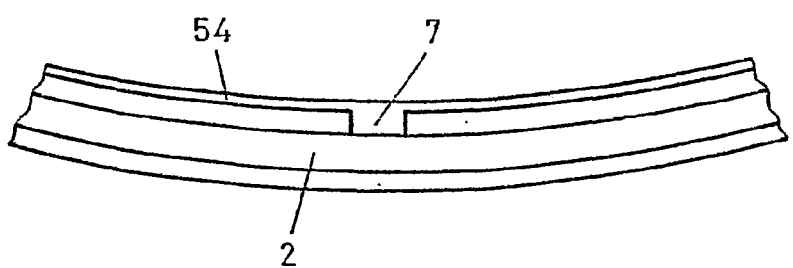
FIG. 6 shows a frontal view of the connection in the invention according to the variation in FIG. 5.

In the embodiment in FIG. 5, a window frame 5', having a strip-shaped adhesive 9 applied, is fastened to the inner side 1b of the windshield 1. A wedge 54 is fitted to a water deflector 2' by means of an integral foil hinge 7. As shown in FIG. 6, said integral foil hinge 7 extends along a relatively small partial section of the wedge 54. However, said integral foil hinge 7 could extend also through the entire length of said wedge 54. This embodiment has the advantage that the wedge is not a separate component, but it is an integral part of the water deflector 2'. The integral foil hinge 7 is designed in such a manner whereby, in a first step, and as explained above, the water deflector 2' may be inserted into the channel 5 without exertion of force. Only in a second step, the wedge 54 is then inserted into the channel 5 and locks subsequently onto the water deflector 2'. The wedge 54 rests with its flush section 54a against the lower edge 1a of the windshield 1. The wedge 54 remains connected to the water deflector 2' during disassembly via said integral foil hinge 7 and it cannot be misplaced thereby. Said wedge 54 may also have sections of varying hardness as it was explained for the wedges 34 and 44 with the aid of FIG. 3 and FIG. 4.

What is claimed is:

1. A connection between the lower edge of a motor vehicle glass windshield and a water deflector, comprising a window frame which extends along said lower edge of said windshield and which is fastened to the bottom side of said windshield, whereby said window frame forms a channel extending essentially parallel to said lower edge and whereby a retaining connecting member of said water deflector has a lip and engages said channel, wherein a wedge is inserted into said channel whereby said wedge is designed in the form of a strip having a first and a second end and secures said retaining connecting member inside the channel, and said window frame is provided with a U-shaped piece, wherein said lip interlocks with a retaining lip molded on the U-shaped piece and protrudes into said channel.

2. A connection according to claim 1, wherein said wedge is detachably interlocked with said window frame.

3. A connection according to claim 1, wherein said wedge is interlocked with said retaining connecting member of said water deflector.

4. A connection according to claim 1, wherein said wedge is a flexible strip made of synthetic material.

5. A connection according to claim 1, wherein said wedge extends essentially along the entire length of the lower edge of said windshield.

6. A connection according to claim 1, wherein said wedge is connected to said retaining connecting member.

7. A connection according to claim 6, wherein said wedge is connected to said retaining connecting member by means of an integral foil hinge.

8. A connection according to claim 1, wherein the front side of said wedge is flush with the outer side of said windshield.

9. A connection according to claim 8, wherein said front side is also flush with the outer side of said water deflector.

10. A connection according to claim 1, wherein said wedge is designed approximately in the shape of a mushroom.

11. A connection according to claim 1, wherein said wedge is designed approximately in the shape of a half-moon and whereby it rests tightly with its upper edge against the outer side of said windshield while being under tension.

12. A connection according to claim 1, wherein said wedge is provided with a continuous inner channel.

13. A connection according to claim 1, wherein said window frame is fastened to the underside of said windshield.

14. A connection according to claim 13, wherein said window frame is glued to said windshield.

15. A connection according to claim 13, wherein said window frame is glued to said windshield by means of an adhesive strip.

16. A connection according to claim 1, wherein said wedge is detachably locked inside said channel.

17. A connection according to claim 1, wherein said wedge is provided with sections of varying hardness, as shown in cross section.

18. A water deflector for a connection according to claim 1, wherein said retaining connecting member is positioned at an upper edge of the water deflector and protrudes downwardly at a right angle.

19. A window frame for a connection according to claim 1, wherein said connection is provided with the U-shaped piece, as shown in a cross section.

* * * * *